United States Patent [19]

Ideskär

[11] 4,081,156

[45] Mar. 28, 1978

[54] PROTECTION DEVICE FOR ARMS OF EJECTION SEAT OCCUPANT

[75] Inventor: Willie Åke Ideskär, Linkoping, Sweden

[73] Assignee: Saab-Scania Aktiebolag, Linkoping, Sweden

[21] Appl. No.: 762,240

[22] Filed: Jan. 25, 1977

[30] Foreign Application Priority Data

Jan. 28, 1976 Sweden .............................. 7600854

[51] Int. Cl.² ...................... B64D 25/04; B64D 25/10
[52] U.S. Cl. ........................ 244/122 AG; 244/122 R; 297/384
[58] Field of Search ........ 244/122 R, 122 A, 122 AE, 244/122 AG, 122 AH, 121, 141; 297/384, 390

[56] References Cited

U.S. PATENT DOCUMENTS

| | | | |
|---|---|---|---|
| 2,829,850 | 4/1958 | Culver | 244/122 AH X |
| 3,083,938 | 4/1963 | Brinkworth et al. | 244/122 AH |
| 3,214,117 | 10/1965 | James et al. | 244/122 A |

*Primary Examiner*—Barry L. Kelmachter
*Attorney, Agent, or Firm*—Ira Milton Jones & Associates

[57] ABSTRACT

Triangular net-like arm restraining members, one for each side of an aircraft ejection seat, extend during the first phase of ejection so that each has an upper corner near the top of the back portion of the seat, a front corner near the front of the horizontal seat portion, and a lower corner near the junction of the back and seat portions. The upper corner of each restraining member is anchored near the top of the back portion, at its side thereof. The restraining members are normally furled and extend laterally outwardly from the back portion to the cabin wall, thence forwardly along the cabin wall, to be spaced, embracing relation to the seat occupant's shoulders. Upon ejection, one tension element for each restraining member draws its front corner forwardly, downwardly and laterally inwardly; another draws its lower corner downwardly.

11 Claims, 5 Drawing Figures

PROTECTION DEVICE FOR ARMS OF EJECTION SEAT OCCUPANT

This invention relates to protection equipment for the occupant of an aircraft ejection seat, and more particularly to means for so positioning and confining the arms of an ejection seat occupant during ejection as to ensure that he will safely clear all parts of the aircraft structure and that his arms will not flail uncontrollably in the airstream after the seat leaves the aircraft.

When an ejection seat is actuated, to catapult the seat and its occupant out of an aircraft in which the seat is normally mounted, the seat occupant's arms should be in such positions that they cannot encounter any part of the aircraft structure and can safely sustain the high forces that are imposed upon them by the relative wind after the occupant leaves the aircraft. It is not realistic to expect the occupant to assume any prescribed ejection position voluntarily, because he may be injured, or he may be subjected to forces so high that he cannot assume or maintain a safe position by his own efforts.

Various devices have therefore been proposed for safely positioning the arms of an ejection seat occupant at the time of ejection.

U.S. Pat. No. 3,074,669, to N. I. Bohlin, discloses a harness-like arrangement of lines which were connected to the airman's arms whenever he occupied the ejection seat. The lines were also connected with the fixed aircraft structure in such a manner that the initial motion of the seat during ejection drew the airman's arms to safe positions close to his body, where they were held until he had been propelled to some distance from the aircraft and was separating from the seat. While satisfactory in operation, this device required the airman to make an awkward connection as he entered the seat, and also required that he wear a special flying suit which incorporated the harness.

U.S. Pat. No. 3,630,472, to C. E. Axenborg, discloses an arrangement of inflatable bladders normally stowed in collapsed condition at opposite sides of an ejection seat, in a recess beneath an overhanging wall portion of the aircraft structure. These bladders were rapidly inflated during a very short interval just before the beginning of ejection propulsion of the seat, and by their inflation they pushed the seat occupant's hands and arms out from under the overhanging wall portion of the aircraft. Such inflatable devices were effective to prevent the seat occupant from coming into injurious contact with aircraft structure as he was being moved out of the aircraft, but they stayed with the aircraft, and therefore they could not confine the occupant's arms against uncontrollable flailing after he entered the outside airstream.

Another proposed device for restraining the arms of an ejection seat occupant during ejection is disclosed in U.S. Pat. No. 3,214,117, to E. L. James et al. It consisted of a pair of nets, one at each side of the seat, each normally in a furled condition alongside the seat. The nets were erected during the initial stage of the ejection procedure and stayed with the seat as it left the aircraft. If the seat occupant had his arms within the confines of the seat when ejection was initiated, the nets disclosed by James et al would in fact confine the arms against outward movement. But if one of the occupant's forearms was spaced laterally outwardly of the seat as the net on that side of the seat was erected, the net could interpose itself between that arm and his torso, and might actually prevent him from bringing the arm back into the confines of the net. Thus the protection device disclosed by James et al could create or aggravate the very conditions that it was intended to prevent.

The present invention, by contrast, has as its object the provision of a protection device for the occupant of an aircraft ejection seat whereby the seat occupant's arms are forcibly but gently moved to safe positions during the initial stage of seat ejection and are confined in such positions while the seat is being propelled out of the aircraft and for a time thereafter, so that the device not only protects the seat occupant from injury while he is being catapulted out of the aircraft but also confines his arms against uncontrolled flailing movements after the seat has left the aircraft.

A more specific object of this invention is to provide a protection device for an ejection seat occupant that is of the type comprising a pair of net-like restraining members, one at each side of the ejection seat, arranged to stay with the ejection seat as it leaves the aircraft, which protection device is characterized by means operative during the initial stage of ejection for causing the restraining members to be brought from an out-of-the-way furled condition to an unfurled operative condition in such a manner that the restraining members, as they unfurl, can sweep the seat occupant's arms laterally inwardly, forwardly and downwardly, so that the arms will be wholly within the confines of the net-like members when those members are fully extended.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which.

Figure 1:
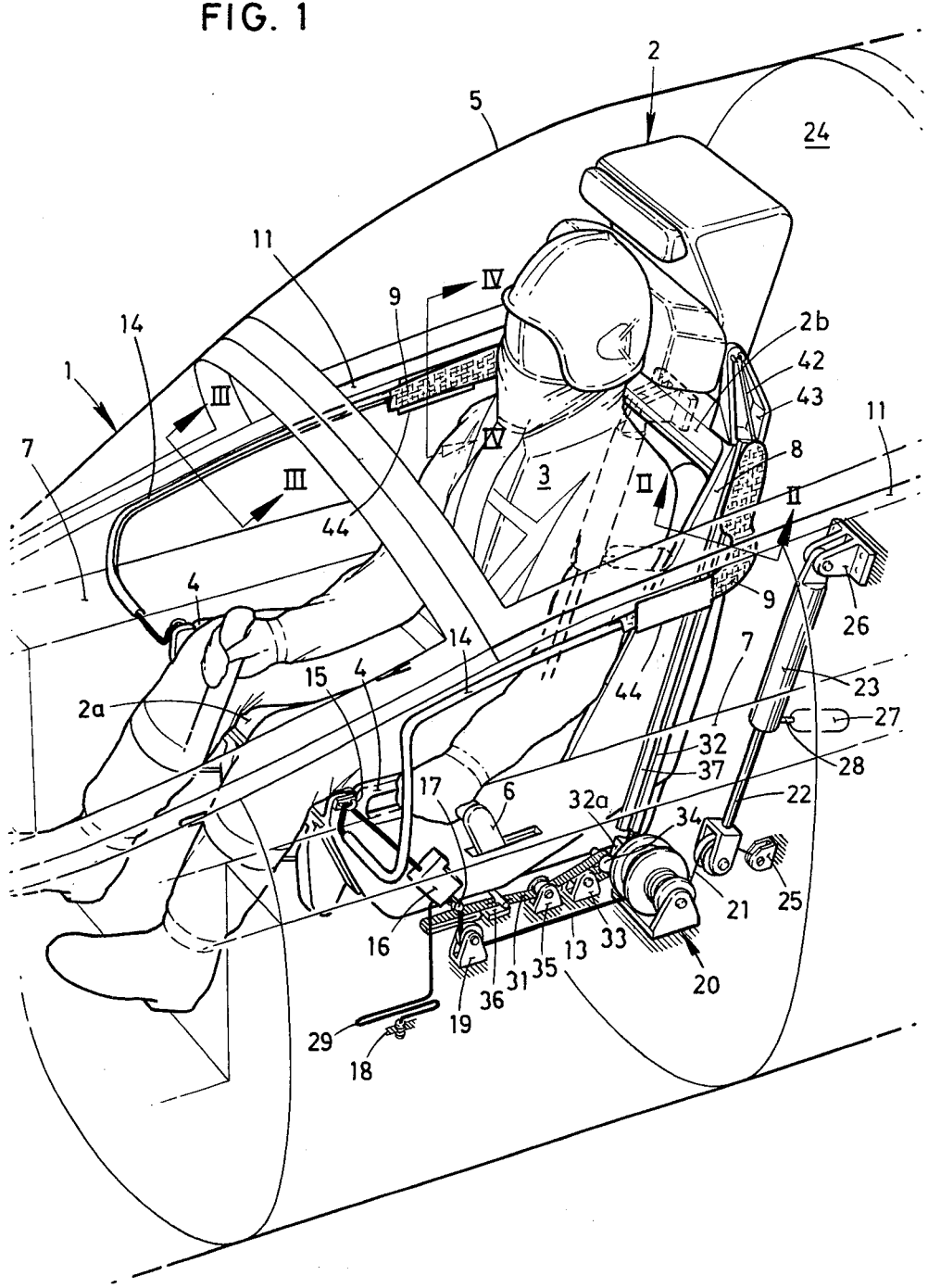
FIG. 1 is a fragmentary perspective view of the cabin portion of an aircraft in which there is installed an ejection seat equipped with the restraining means of this invention, the aircraft structure being shown more or less schematically and the apparatus being depicted in its normal condition prior to ejection.

Referring now to the accompanying drawings, the numeral 1 designates generally a portion of an aircraft cabin in which there is normally carried an ejection seat designated generally by 2. The seat has a substantially horizontal seat portion 2a and an upright back portion 2b which projects upwardly from the rear of the seat portion. When an occupant 3 of the ejection seat 2 desires to make an emergency escape from the aircraft, he pulls either of a pair of release handles 4 that are mounted on opposite sides of the seat portion 2a, near the front of it. This initiates the operation of mechanism that effects jettisoning of a canopy 5 over the ejection seat, actuates the restraining devices that are described below, and propels the seat upwardly out of the aircraft after the canopy 5 is well clear of the path of the seat.

Extending fore and aft along each side of the aircraft cabin is a shelf-like plinth 7 on which are mounted various control levers, switches and the like that the seat occupant manipulates during normal flight. Of these, only a throttle lever 6 is illustrated. Above the plinths 7 the cabin narrows upwardly to a rail or gunwale 11 that extends fore and aft along each side of the canopy opening, at about the level of the seat occupant's shoulders. Thus each plinth 7 cooperates with its overhanging portion of the cabin wall to define a laterally inwardly opening recess.

When manipulating the throttle lever 6, the seat occupant has his left arm stretched out forwardly and laterally outwardly, so that at least the hand and forearm of his left arm are then located in one of the opposite recesses just mentioned, beyond the left-hand edge of the ejection seat 2. It is thus possible that at the instant when ejecting movement of the ejection seat begins, the seat occupant will have at least one hand over a control plinth 7, and he may not have the time or the strength to withdraw that arm voluntarily to a safe position in which it will clear the overhanging rail 11.

The restraining devices of this invention are arranged to sweep the recess between each rail or gunwale 11 and the control plinth 7 therebeneath, capture and envelop the seat occupant's forearm if it is in that recess, carry the arms to safe positions for ejection, and confine the arms until the occupant is separated from the seat upon deployment of a parachute (not shown) that is carried with the seat. The restraining devices comprise a pair of substantially triangular net-like restraining members 12 (best seen in FIG. 5), one for each side of the seat. The restraining members are normally stowed in folded or furled condition, and they are arranged to unfurl and extend with a forward and inward sweeping action and also with a downward component of motion.

In part, the sweeping action just described is obtained by reason of the location and disposition of the restraining members in their stowed condition, and in part it is achieved by the means for extending those members to their operative conditions, all as will appear more clearly from the explanation that follows.

Since the restraining members 12 and the respective actuating mechanisms for them are duplicated at opposite sides of the seat, the description that follows will focus upon the left-hand restraining member and its actuating mechanism, and it will be understood that the description is also applicable in all respects to the restraining device at the right-hand side of the seat.

Each restraining member 12 is made of sturdy netting or other material that is supple, strong and air-permeable. Because of its generally triangular shape, the restraining member has three corner portions, namely: an upper corner portion (shown as somewhat truncated) which is anchored by means of a line 42 to an upwardly extending bracket 43 fixed to the upper part of the back portion 2b of the seat; a forward corner portion which, in the extended condition of the member, is located near the front of the seat portion 2a of the seat; and a lower corner portion which, in the extended condition, is near the junction of the seat and back portions.

Figure 4:
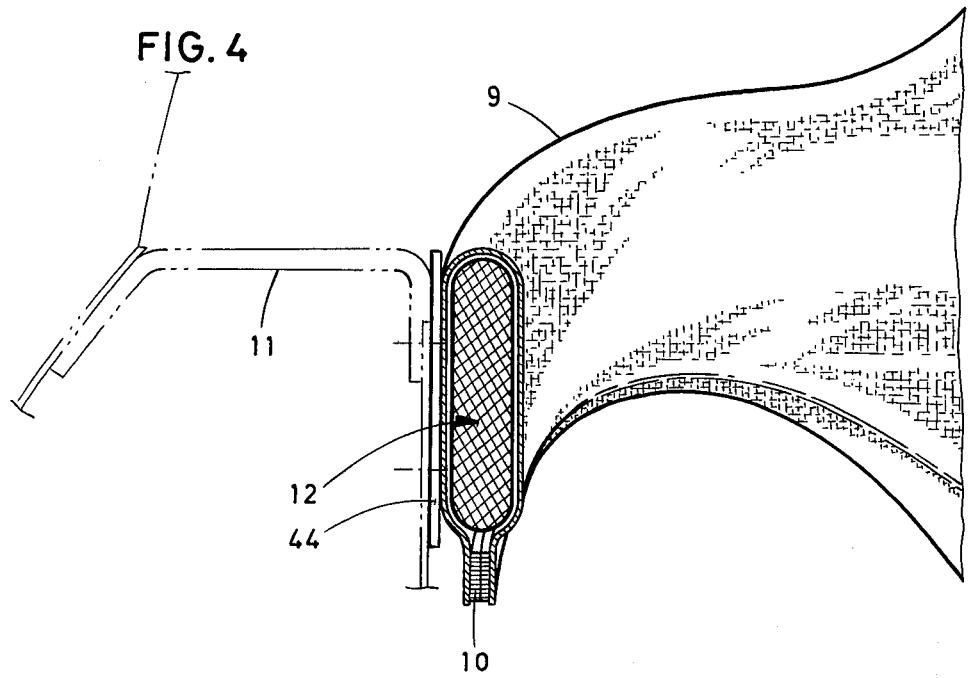
FIG. 4 is a fragmentary sectional view taken on the plane of the line IV—IV in FIG. 1.

In its furled condition the restraining member is stowed in an elongated envelope or pocket 9 that has opposite longitudinal edges readily separably connected as by means of a self-clinging "Velcro"-type strip fastening 10 (see FIG. 4). Various alternative readily releasable confining means for stowing the restraining member in folded condition will readily occur to those skilled in the art, but the pocket or envelope 9 that is here illustrated has the advantage of protecting the stowed retaining member as well as releasing it quickly, easily and smoothly for its extension.

One end portion of each pocket or envelope 9 is secured to the back portion 2b of the seat, near the top thereof, each envelope of course being secured at its respective side of the seat. From the back portion 2b, each envelope, with its folded-up restraining member secured therein, extends laterally outwardly to the cabin wall, and thence forwardly along the rail or gunwale 11 of the aircraft cabin, preferably just below that rail, so that the forward portion of the envelope is at or slightly below the level of the seat occupant's shoulders and is spaced laterally outwardly from the seat. In effect, therefore, the furled restraining members are in embracing relation to the seat occupant's shoulders but spaced outwardly from them.

The envelope 9 has one anchorage to the back portion 2a of the seat, near the top thereof, and another anchorage 44 on the cabin wall, laterally opposite the back portion. One or both of these anchorages can be readily broken away by ejecting movement of the seat.

When ejection takes place, each restraining member 12 is actuated to its operative condition by means of a pair of elongated tension elements, namely a tension cord 13 that is connected to the front corner of the restraining member and a tension band 31 which is connected with the lower corner of the restraining member. The tension cord 13 serves to draw the restraining member forwardly and laterally inwardly. Preferably the cord 13 is drawn to a preliminarily tensioned condition before the seat begins its ejection motion relative to the aircraft structure, and then it completes the forward extension of the restraining member as the seat begins its upward motion. The tension band 31 draws the restraining member downwardly. It is rendered operative by motion of the seat relative to the aircraft, but it completes the downward extension of the restraining member before the seat has moved more than partway out of the aircraft.

Figure 3:
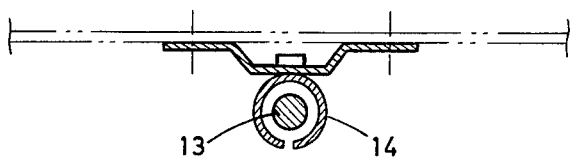
FIG. 3 is a fragmentary sectional view taken on the plane of the line III—III in FIG. 1.

The tension cord 13, which can be made of a textile material, extends forwardly from the envelope 9 for its restraining member and into a slitted plastic tube 14. The tension cord is normally confined in the slitted tube but can be withdrawn laterally from it, through the slit (see FIG. 3), because the tube allows itself to be flexed radially outwardly. It will be understood that the tension cord 13 can be releasably maintained in its inoperative position in some other suitable manner, but the slitted tube 14 is especially suitable because it prevents risk of interference between the cord 13 and the many control knobs and the like that are located in this part of the cabin.

Each slitted tube 14 extends from the front end of its adjacent envelope 9, forwardly along the cabin wall (e.g., just under and along the rail or gunwale 11) to a point approximately laterally opposite the front edge of the seat portion 2a, thence downwardly along the cabin wall and laterally inwardly across the plinth 7, terminating a little short of the seat. The tension cord 13 normally extends lengthwise inside the slitted tube and then beyond it to pass through an eyelet 15 fixed on its adjacent side of the seat portion 2a, near the front thereof. From the eyelet 15 the tension cord 13 continues obliquely rearwardly and downwardly through a locking device 16 which is fixed to the side wall of the seat and which permits the cord to move freely downwardly (i.e., in the tensioning direction) but prevents its movement in the opposite direction. The cord 13 extends further in the oblique downward and rearward direction for a short distance below the locking device 16, to a guide pin 17 which projects outwardly from the side wall of the seat. It wraps partway around that pin, and thence extends vertically downwardly to a guide pulley 19 which is fixed to the floor 18 of the cabin. Passing under the pulley 19, the cord 13 extends rearwardly from it to a two-diameter wind-up spool 20 which is mounted on the cabin floor for free rotation about a laterally extending axis. The cord 13 is fastened to the larger-diameter drum of the two-diameter spool and has a few turns around that drum to ensure that the drum will take up the cord by its rotation.

When seat ejection is initiated, rotation of the two-diameter spool 20 is effected by means of a cable 21 which is normally wound around its smaller diameter drum portion and which is unwound therefrom by a plunger mechanism comprising a piston 22 that is slidable in a gas cylinder 23. The cable 21 has a substantial number of turns around the two-diameter spool 20, whence it extends rearwardly to a fixed anchorage 25 on a bulkhead or other cabin structure behind the seat, passing over a pulley or the like that is carried by the piston 22 of the plunger mechanism. The cable 21 is of course wound about the two-diameter spool in the direction opposite to that in which the cord 13 is wound around it, so that pulling the cable 21 off of the spool 20 causes the cord 13 to be wound onto it.

As mentioned above, when one of the ejection handles 4 is pulled, the canopy 5 is caused to be jettisoned before the seat begins to move relative to the aircraft. During the brief interval in which the canopy is being jettisoned, the tension cord 13 can be tensioned to pull it laterally out of its slitted tube 14, to open the envelope 9, and to initiate forward movement of the restraining member 12. The plunger mechanism comprising the piston 22 and cylinder 23 is actuated for such initial tensioning of the cord 13.

The cylinder 23 extends generally vertically and is pivotally connected at its upper end to a bracket 26 which is in turn fixed to a bulkhead or other fixed aircraft structure behind the seat. The piston 22 extends downwardly from the cylinder and moves upwardly in it, as can be seen from a comparison of FIGS. 1 and 5. Actuation of the ejection handle 4 can effect detonation of an explosive charge in a cartridge 27 that is communicated with the cylinder 23 by means of a duct 28. The highly pressurized gases from the cartridge enter the cylinder beneath the head of the piston 22, driving the piston upwardly and thus drawing the cable 21 off of the two-diameter spool 20 to wind the cord 13 onto it. The two-diameter spool is used because the piston 22 moves up with a rapid and powerful motion through a relatively short stroke, and winding the cord 13 onto the larger-diameter portion of the spool produces a larger but less abrupt and forceful lengthwise movement of the cord.

It will be apparent that as the cord 13 is tensioned, it will first disengage itself from the slitted plastic tube 14, and as it effectively shortens, it and the furled restraining member to which it is attached will extend in a straight line from the envelope anchorage 44 to the eyelet 15 at the front of the seat. Continued drawing up of the cord 13 will cause it to pull the restraining member forwardly out of the envelope 9. The restraining member will naturally follow the course of the cord, moving forwardly, downwardly and laterally inwardly toward the eyelet 15.

Because the guide pulley 19 and the two-diameter spool 20 are both fixed to the cabin structure, it will be apparent that further tensioning of the cord 13 takes place as the seat 2 begins to move upwardly relative to the aircraft, and hence the final phase of the forward-inward extension of each restraining member can occur during the initial phase of ejecting motion of the seat. (The known catapult or so-called ejection gun by which the seat is propelled out of the aircraft is now shown.)

A normally slack cut-off cord 29 extends between the locking device 16 on the seat and an anchorage point on the cabin floor. As the seat begins to rise in the aircraft, the cut-off cord 29 is tensioned until an eyelet lug 30 at its upper end (see FIG. 5) is pulled out of the locking device 16. The tension cord 13 passes through the eyelet lug 30 at a point below the locking mechanism of the locking device 16, and therefore withdrawal of the eyelet lug 30 from the locking device causes the tension cord 13 to be cut when the seat reaches a certain point in its rising motion, thus preventing any further drawing up of the tension cord. However, the locking device 16, in preventing any slackening movement of the tension cord 13, maintains such tension as has been applied to it, and thus ensures that the restraining member 12 will have its forward corner securely held near the eyelet 15.

In moving the seat occupant's arm out of the recess above the plinth 7, the restraining member 12 may bring the arm to rest on the occupant's lap, or, if the arm is not flexed at the elbow, it may confine his forearm against the side surface of the seat. In either case, the arms will be effectively restrained against flailing movements under the force of the airstream outside the aircraft and will of course be in positions in which they can safely clear the rails or gunwales 11 along the opposite sides of the canopy opening.

The tension element 31 is a textile band that is connected at an upper end thereof to the lower corner of the restraining member 12. It extends downwardly from the restraining member to pass through a locking device 32a which is fixed to the side of the seat portion 2a, near the rear thereof, whence it extends to a guide pulley 33 which is fixed to the cabin floor, looping under that guide pulley and back up to a pulley 34 which is fixed to the side of the seat, just forward of the locking device 32a. Looping over the seat-mounted pulley 34, the band 31 again extends downwardly to pass under a second guide pulley 35, mounted on the cabin floor just ahead of the first guide pulley 33; and then it extends forwardly for cooperation with a T-shaped band slitting device 36. A length of the band 31 extends forwardly of the slitting device 36 and can be folded upon itself and stowed as shown in FIG. 1.

The band slitting device 36 is of the type disclosed in U.S. Pat. No. 3,334,847, to C. E. Axenborg. Briefly, it consists of a T-shaped member fixed to the cabin floor. The stem portion of the T-shaped member projects through a short lengthwise extending slot in the band and its cross-member overlies the band and is oriented transversely to its length. As the band 31 is pulled lengthwise with sufficient force, in the direction toward the rear of the aircraft as here illustrated, the band is lengthwise slit by the blunt stem portion of the slitting device, tearing with a predetermined resistance by which it is maintained under a constant tension as the seat rises in the aircraft.

Figure 2:
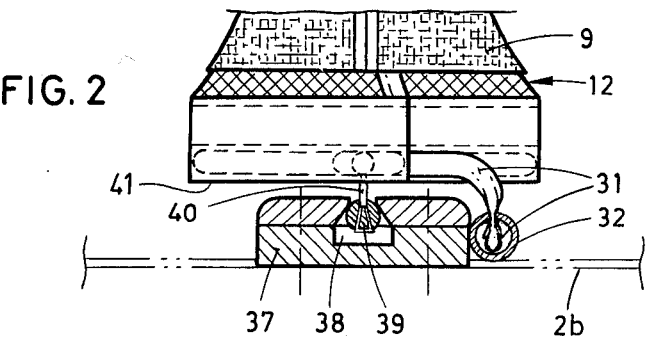
FIG. 2 is a fragmentary sectional view taken on the plane of the line II—II in FIG. 1.
Figure 5:
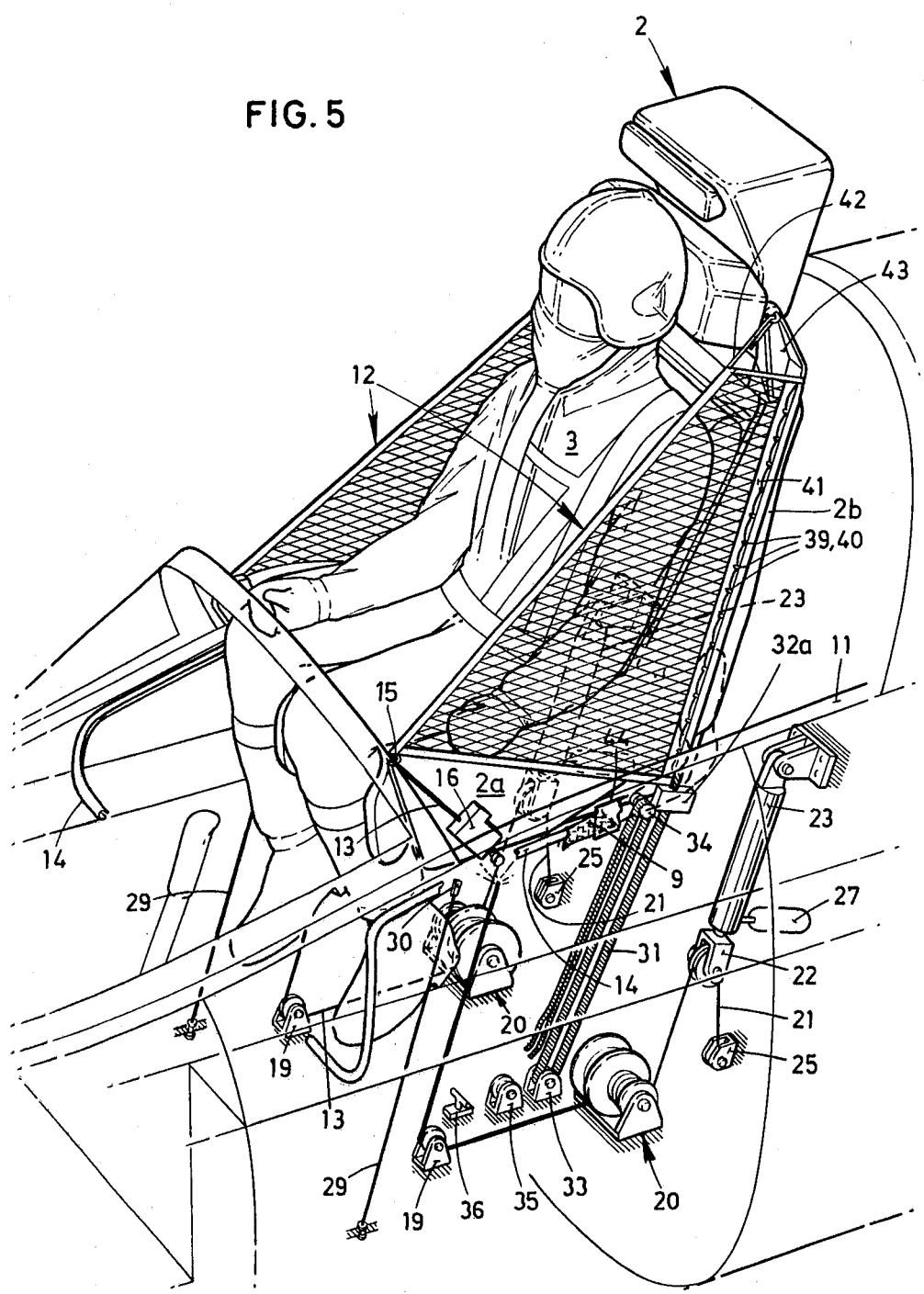
FIG. 5 is a view generally similar to FIG. 1 but showing the ejection seat at the stage of its ejecting movement out of the aircraft at which the restraining members of this invention are in their fully extended operative condition.

The portion of the tension band 31 that normally extends above the locking device 32a is lengthwise slidably confined in a lengthwise slotted tube 32 that extends along the side of the back portion 2b of the seat, through most of the height thereof (see FIGS. 2 and 5). Alongside the tube 32 there extends an elongated track member 37 in which there is a lengthwise extending dovetail slot 38. Confined in the slot 38 are a large number of spherical beads 39, each connected by a short cord 40 to a reinforcing band 41 which extends along the rear edge of the restraining member 12, the cords 40 being connected to the reinforcing band at regular intervals therealong, as best seen in FIG. 5.

It will be evident that as the seat 2 rises in the aircraft, the tension band 31 is drawn downwardly relative to the seat, and it draws down the rear edge of the restraining member 12. Such downward extension takes place substantially simultaneously with the forward extension of the restraining member that is effected by the tension cord 13. As the restraining member unfurls downwardly, the beads 39, in cooperation with the track member 37, confine its rear edge to downward motion and hold the reinforcing band 41, all along its length, against forward displacement under the tension exerted by the cord 13.

As the seat continues its upward movement during ejection, the tension band 31 is of course torn all the way through its free end, as shown in FIG. 5, and it comes away from the aircraft with the seat. The reinforcing band 41 along the rear edge of the restraining member is maintained under lengthwise tension, even after the tension band is disengaged from the slotting device 36, by the cooperation of the locking device 32a with the tension band 31.

The restraining members 12 thus remain in their fully extended positions after the seat leaves the aircraft; and since the locking devices 16 and 32a hold them substantially coplanar with the respective side edges of the seat, they confine the occupant's arms against outward movements. Since each restraining member is well anchored all along its rear edge by the securement structure comprising the elongated track member 37 and the spherical beads 39 that slide in the dovetail slot 38 of said track member, the rear edge portion of the restraining member cooperates with the adjacent side of the back portion 26 of the seat to provide a narrow forwardly opening pocket that limits rearward movement of the seat occupant's arm along the side of the seat portion 2a. Thus, if one of the occupant's arms is located laterally outwardly of the seat during ejection, it will be confined by the restraining member against both rearward and laterally outward movement so that it cannot flail in the wind.

From the foregoing description, taken with the accompanying drawings, it will be apparent that this invention provides a safety device for the occupant of an aircraft ejection seat whereby the occupant's arms are captured and swept forwardly, inwardly and downwardly during the initial stage of ejection; and whereby, as ejection continues, the arms are confined to positions in which they cannot encounter any part of the aircraft structure and cannot flail uncontrollably in the outside airstream.

Those skilled in the art will appreciate that the invention can be embodied in forms other than as herein disclosed for purposes of illustration.

The invention is defined by the following claims:

I claim:

1. In an ejection seat having a substantially horizontal seat portion and a back portion projecting upwardly from the seat portion at the rear thereof, said seat being arranged to be ejected substantially vertically out of an aircraft in which the seat is normally carried and in which there is structure that is spaced laterally to opposite sides of said seat and back portions, restraining means for protecting the arms of an occupant of the seat during ejection thereof, said restraining means comprising:

A. a pair of net-like restraining members, one at each side of the ejection seat, each of said restraining members being substantially triangular so as to have first, second and third corner portions,
  (1) the first corner portion of each restraining member being secured to its adjacent side of the back portion, near the top thereof, and
  (2) each restraining member, when extended, being of such size that
    (a) the second corner portion thereof can be located near the front of the seat portion at its adjacent side thereof, and
    (b) the third corner portion thereof can be located near the junction of the seat and back portions, at its adjacent side thereof;
B. readily releasable confining means for each restraining member normally maintaining the restraining member in a furled condition;
C. means so supporting said confining means that each furled restraining member extends substantially laterally outwardly from said back portion, near the top thereof, to said structure; and
D. actuating means rendered operative upon the initiation of seat ejection, for drawing each restraining member away from its said confining means and unfurling the restraining member with a motion that has forward, downward and laterally inward components, said actuating means comprising for each restraining member
  (1) guide means fixed to the side of said seat portion near the front thereof,
  (2) a first elongated tension element having a connection with said second corner portion of the restraining member and which extends through said guide means, and
  (3) a second elongated tension element having a connection with said third corner portion of the restraining member and which is constrained to lengthwise motion substantially downwardly relative to the seat and alongside the back portion.

2. The restraining means of claim 1, further characterized by:

E. each of said tension elements also having a connection with a relatively fixed part of the aircraft so as to be tensioned by an ejecting motion of the seat relative to the aircraft;
F. said guide means comprising a locking device by which the first tension element is permitted to move substantially freely in one longitudinal direction but is held against motion in the opposite direction; and G. a second locking device at each side of the seat, near the junction of said seat and back portions, by each of which one of the second tension elements is confined to lengthwise motion substantially downwardly relative to the seat and is held against lengthwise motion in the upward direction.

3. The restraining means of claim 1 wherein said readily releasable confining means for each restraining member comprises an elongated envelope having opposite longitudinally extending edge portions which readily separably cling to one another.

4. The restraining means of claim 1, further characterized by:
said means supporting said confining means further so disposing the confining means that each furled restraining member extends forwardly a distance along said structure.

5. The restraining means of claim 1, further characterized by:
E. motion guiding means having a slidable connection with the back portion of the seat and anchored to each restraining member along an edge thereof that extends between said first and third corners thereof for substantially confining said edge of each restraining member against motion transverse to its length, so that each restraining member, when extended can cooperate with the back portion of the seat to limit rearward movement of an arm of the occupant of the seat.

6. Arm restraining means for an ejection seat that has a substantially horizontal seat portion and a back portion projection upwardly from the seat portion at the rear thereof, said seat being arranged for ejection substantially vertically out of an aircraft in which the seat is normally carried and which has cabin structure that is spaced laterally to opposite sides of said seat and back portions, said arm restraining means being of the type comprising a pair of net-like restraining members, one of said restraining members for each side of the seat, each of said restraining members being substantially triangular, with three corner portions, and being movable to an operative position in which the restraining member is closely adjacent to its side of the seat, with a first corner portion near the front of the seat portion, a second corner portion near the junction of the seat and back portions, and the third corner portion near the top of the back portion, said arm restraining means being characterized by:
A. said third corner portion of each restraining member being anchored to the back portion of the seat, near the top thereof;
B. an elongated first tension element secured to the first corner portion of each restraining member;
C. an elongated second tension element secured to the second corner portion of each restraining member;
D. means for maintaining substantial tension upon each of said tension elements during a period which begins very shortly after an initiation of seat ejection and continues through the completion of ejection;
E. guide means fixed to each side of the seat portion, near the front thereof, the first tension element for each restraining member being trained through the guide means at the side of the seat adjacent to the restraining member;
F. other guide means on the back portion, at each side thereof, by which each of said second tension elements is confined to substantially downward motion relative to the seat in consequence of the application of tension thereto; and
G. readily releasable means for normally maintaining each of said restraining members in a furled condition and with each furled restraining member extending substantially laterally outwardly from said back portion, near the top thereof, to said cabin structure, so that the application of tension to said tension elements causes each of the restraining members to be unfurled with forward, downward and laterally inward components of motion.

7. The arm restraining means of claim 6 wherein said readily releasable means for normally maintaining each of said restraining members in a furled condition also extends a distance forwardly along said structure.

8. The arm restraining means of claim 6, further characterized by:
H. means whereby an edge portion of each restraining member that extends between the third and second corner portions thereof is constrained to substantially lengthwise motion during unfurling of each restraining member and is thereafter held against displacement transversely to its length, the last mentioned means comprising
(1) elements anchored to said edge portion of each restraining member at intervals along the length thereof, and
(2) elongated guide means on the back portion, along the side thereof adjacent each restraining member, in which said elements are confined to lengthwise motion.

9. Arm restraining means for an ejection seat that has a substantially horizontal seat portion and a back portion projecting upwardly from the seat portion at the rear thereof, said seat being arranged for ejection substantially vertically out of an aircraft in which the seat is normally carried and which has cabin structure that is spaced laterally to opposite sides of said seat and back portions, said arm restraining means being of the type comprising a pair of net-like restraining members, one of said restraining members for each side of the seat, each of said restraining members being substantially triangular, with three corner portions, and being movable to an operative position in which the restraining member is closely adjacent to its side of the seat, with a first corner portion near the front of the seat portion, a second corner portion near the junction of the seat and back portions, and a third corner portion near the top of the back portion, said arm restraining means being characterized by:
A. said third corner portion of each restraining member being anchored to the back portion of the seat, near the top thereof;
B. stowage means for readily releasably maintaining each of said restraining members in a furled condition;
C. means cooperating with said stowage means to so dispose each furled restraining member that each restraining member extends laterally outwardly from the back portion, near the top thereof, to said cabin structure, so that the furled restraining members are substantially in outwardly spaced embracing relation to the shoulders of an occupant of the seat; and
D. actuating means rendered operative upon the initiation of seat ejection for unfurling each restraining member to said operative position thereof, said actuating means comprising
(1) means for moving the first corner portion of each restraining member in a forward, downward and laterally inward direction, the last mentioned means comprising
   (a) an element fixed on each side of the seat portion, near the front thereof, and
   (b) means connected with said first corner portion of each restraining member and with an adjacent one of said elements for drawing said first corner portion toward said one adjacent element, and
(2) means for moving the second corner portion of each restraining member in a substantially downward direction, which means comprises
   (a) a second element fixed on each side of the seat near the junction of said seat and back portions, and
   (b) means connected with said second corner portion of each restraining member and with an adjacent one of said second elements for drawing said second corner portion toward said one adjacent second element.

10. The arm restraining means of claim 9, wherein said means cooperating with said stowage means further disposes each furled restraining member to extend a distance forwardly along said cabin structure.

11. The arm restraining means of claim 9, further characterized by:
E. motion restricting means comprising
   (1) an elongated guide element secured to the back portion of the seat, at each side thereof, and
   (2) means anchored along an edge of each restraining member that extends between the second and third corner portions, engaged with one of said guide elements to be confined thereby to lengthwise motion therealong, for holding said edge against motion in directions transverse to its length.

* * * * *